June 29, 1965   H. C. RESSLER   3,192,391
PHOTOSENSITIVE FIBER OPTIC SCANNER
Filed Jan. 8, 1963

INVENTOR.
HUGH C. RESSLER
BY Edward V. Connors
Attorney

United States Patent Office 3,192,391
Patented June 29, 1965

3,192,391
PHOTOSENSITIVE FIBER OPTIC SCANNER
Hugh C. Ressler, Flushing, N.Y., assignor to Hogan
Faximile Corporation, New York, N.Y.
Filed Jan. 8, 1963, Ser. No. 250,057
7 Claims. (Cl. 250—227)

The present invention relates to scanners in densitometers, and more particularly to a scanner incorporating an optical fiber as its image dissector.

In certain facsimile transmitters subject copy is scanned by a so-called "scanner" or image dissector in which light is reflected from or passed through, the copy as it is moved past a scan line. The light from elemental areas of the copy is sequentially passed to photoelectric means thereby providing an analogue type electrical signal which is used to control a facsimile recorder to reproduce a facsimile copy.

The scanner or image dissector is used in densitometers to evaluate the light transmitting or reflecting characteristics of subject copy or of copies thereof. In some densitometers the copy is not moved and the scanner is arranged to repetitively scan a characteristic area of the subject copy a single elemental area in width, or a single "sweep" at a time. The sweep may be linear or in any desired pattern. A suitable densitometer using one form of image dissector providing a linear sweep is shown in a co-pending application of John W. Smith, Hugh C. Ressler, and David Shaler, Serial No. 250,079 filed on even date herewith, and titled "Densitometer." When used in a densitometer the output of the scanner may be applied to a display device such as an oscilloscope for visual interpretation of the dissected area, or the output may be connected to any desired indicator means such as a recorder, lamp, meter, counter or logic device.

In some types of prior scanners the image has been dissected by passing a spiral either on a disc or on a drum past a linear slit. Although generally satisfactory such constructions have required a sturdy mounting for both the spiral and linear slits in order to prevent "jitter" or linear variations in the output. The motor to rotate the disc or drum has necessarily been of appreciable size to overcome the friction of the large masses of material used to provide the sturdy construction. Further, the light transmitting slits have required skillful workmanship in order that there is no appreciable variation in their widths along the lengths thereof.

The present invention aims to overcome the foregoing difficulties and disadvantages by providing an improved scanner.

In accordance with the invention this is accomplished by providing a scanner in which the image dissector is an optical fiber formed into a suitable shape so that one end scans or sweeps the image. More specifically, the optical fiber is carried by a rotatable member and is so shaped that one end of the fiber lies along the axis of the rotatable member and is directed towards the sensitive surface of photoelectric means. The other end of the fiber is positioned offset from the axis of the rotatable member so that this end of the fiber is carried in a circular path directed towards a field to be scanned.

In accordance with the teaching of the invention alternative constructions may be utilized in which one end of the fiber is directed at photoelectric means while its other end is carried in any desired pattern by suitable well-known mechanical movements, such as, but not limited to, reciprocating means, cam operated devices, etc.

An object of the invention is to provide an improved scanner which is simple and economical in manufacture, precise in operation, and rugged in use.

Other objects and advantages of the invention will be apparent from the following description and from the accompanying drawings which show, by way of example, an embodiment of the invention.

Figure 1:
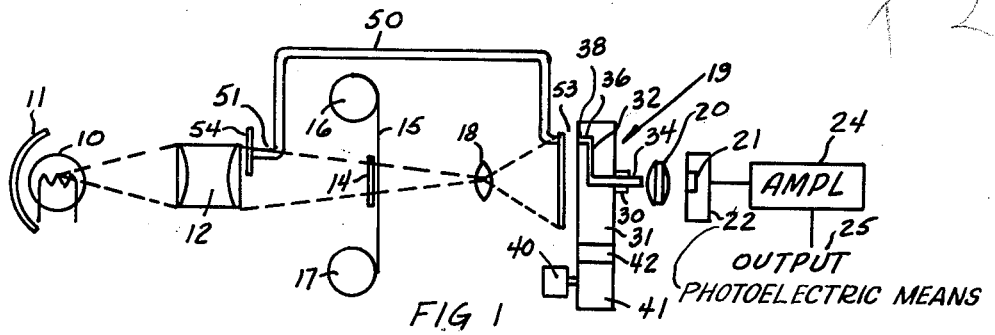
FIGURE 1 is a schematic view of a scanner in accordance with the invention.

Referring to the drawings there is shown in FIGURE 1 a schematic illustration of a scanner in accordance with the invention. Light from a source 10 and from a reflector 11 is directed through condenser lens 12 to a field of scan 14 across which is passed a film 15 from a roller 16 to a take up roller 17. The light transmitted by the film 15 is collected by a lens 18 and focussed on image dissector 19 which passes light through a lens 20 to photosensitive surface 21 of photo-electric means 22. An amplifier 24 is connected to the photoelectric means 22 and feeds an output means 25. The output means 25 may be a display device such as a recorder, oscilloscope, counter, logic device, etc.

The image dissector 19 includes a shaft 30 suitably rotatably mounted by means well known in the art and not shown. The disc 31 is carried by the shaft 30 and has a passageway 32 extending therethrough. A first portion 34 of the passageway 32 extends generally axially of the shaft 30. A second or intermediate portion 35 extends radially of the disc 31 from the first portion 34. A third portion 36 of the passageway 32 extends generally parallel to the first portion 34. Within the passageway 34, 32, 36 is positioned an optical fiber 37 having an outer end 38. The fiber 37 may have a diameter as desired ranging from perhaps two mils to one-tenth of an inch in diameter depending upon the size of the elemental area to be scanned. Satisfactory scanners have been operated using fibers of three and six mils in diameter. The fiber is secured in position by means of cement 39 or any other suitable material. A motor 40 with a driving pulley 41 is positioned at one side of the rotatable disc 31 and is in driving relationship therewith by means of a belt 42 passed over the pulley 41 and around the periphery of the rotatable disc 31.

A second optical fiber 50 is arranged so that one end 51 is positioned intermediate the condenser lens 12 and the field of view 14 facing the light source 10. Other end 52 of the optical fiber 50 is directed towards the outer end 38 of the first optical fiber 37. The optical fiber 50 is suitably encompassed by tubing or the like so as to be shielded from extraneous light. Upon the rotation of the disc 31 the outer end 38 of the optical fiber 37 passes end 52 of the second optical fiber 50 and thereby produces a pulse in the output of the photoelectric means 22. If desired a neutral density filter 54 may be interposed in the light path of the optical fiber 50 and is most conveniently positioned as illustrated between end 51 of the optical fiber 50 and the condenser lens 12.

Figure 2:
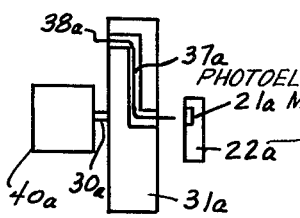
FIGURE 2 is a side view of the rotatable member of the scanner illustrating a somewhat modified construction.

In FIGURE 2 there is shown a somewhat modified construction in which similar numerals are used as in FIGURE 1 with the addition of the letter "a." In this embodiment the motor 40a is in axial alignment with the shaft 30a and rotates the disc 31a directly, the field of view of the image dissector being in the direction of the motor, the size of the motor however being such as to not interfere with the scan.

Figure 3:
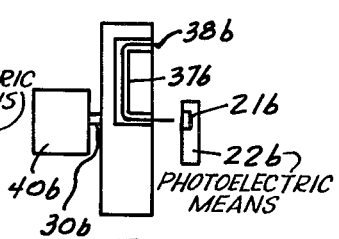
FIGURE 3 is a view corresponding to FIGURE 2 of a further modified construction.

In the embodiment shown in FIGURE 3 similar numerals are used with the addition of the letter "b." In this embodiment the fiber optic 37b has its outer end 38b directed towards the field of scan past the photoelectric means 22b, the disc 31b being directly driven by the shaft of the motor 40b.

Figure 4:
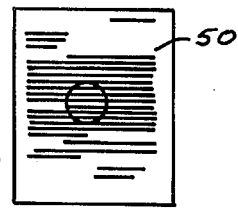
FIGURE 4 is a top view of copy with a circle thereon illustrating a characteristic pattern of the scan.

In FIGURE 4 there is shown a sheet of copy 50 with a circle 51 indicating the pattern of the field of scan as the outer end 38 of the optical fiber 37 is rotated in a circular path.

Figure 5:
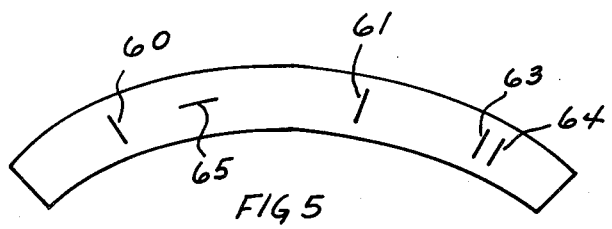
FIGURE 5 is an enlarged portion of the copy shown in FIGURE 4.

In FIGURE 5 there is shown an enlarged portion of the copy shown in FIGURE 4. Single radical lines are indicated at 60 and 61, a double radical line being indicated at 63 and 64, and an angularly-positioned line being indicated at 65.

Figure 6:
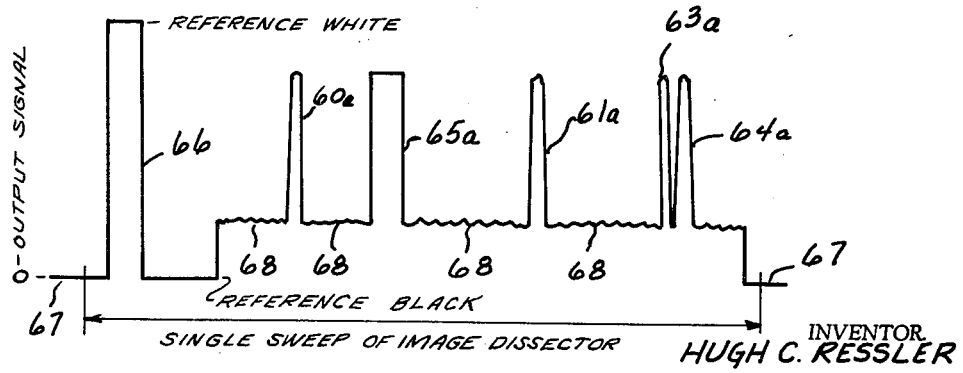
FIGURE 6 is a waveform corresponding to the copy shown in FIGURE 5.

The waveform of the output of the photoelectric means 22 is shown in FIGURE 6, the portions of the waveform corresponding to the vertical and horizontal lines of FIGURE 5 being indicated by corresponding numerals with the addition of the letter "a." In addition the waveform includes a pulse 66 produced by the sampling light passed by the optical fiber 50. The output of the photoelectric means 22 as the outer end of the optical fiber 37 is passing the blanking plate 53 of the optical fiber 50 is indicated at 67 and is "reference black." The blanking plate 53 is an opaque member positioned around the optical fiber blocking light from entering the outer end 38 of the optical fiber 37, thereby forming the "reference black" output of the photoelectric means 22 indicated at 67 on FIGURE 6. The magnitude of the pulse 66 represents "reference white." The level of the background is indicated generally at 65. As described in my copending application Serial No. 250,056 filed on even date herewith and titled, "Photosensitive Scanner With Automatic Range Control," the output of the amplifier 24 may be passed to a pulse separator to separate the pulse 66 and utilize it for a control of the photoelectric means 22.

The construction in accordance with the invention is particularly advantageous in use in a densitometer because the circular field scan views a more equal distribution of light on the copy than is generally had in the case of linear scans. As the center of the optical system for the photoelectric means 22 is positioned on the same axis as the light source 10 there is a minimum of inequalities in light distribution through the lens system without the necessity of making laborious and tedious adjustments of the light distribution as is the case when a linear scan is used.

While the invention has been described and illustrated with reference to specific embodiments thereof, it will be understood that other embodiments may be resorted to without departing from the invention. Furthermore, while the invention has been described with reference to its application in a transmission type scan construction it is obvious that the construction might be modified as is well known in the art to provide a scan of the reflecting type in which markings, etc. on the surface of subject copy vary the light reflected therefrom the scanner being used to measure the variations in the light reflected from the copy, such scanners being shown in Stamps Patents 2,976,361 and 2,976,362. Therefore, the form of the invention set out above should be considered as illustrative and not as limiting the scope of the following claims.

I claim:

1. A scanner comprising means providing a field to be scanned, a light source positioned to illuminate the field to be scanned, rotatable means having its axis directed towards the field to be scanned, a first optical fiber rotated with the rotating means and having one end directed along the axis of the rotatable means away from the field of scan, the other end of the optical fiber offset from said axis so as to be rotatably carried in a circular path facing the field to be scanned, photoelectric means in light receiving relationship with said one end of the fiber and adapted to provide an electric signal variable in magnitude responsive to light passed through said optical fiber, display means responsive to said electric signal, and a second optical fiber positioned to convey sampling light from the light source to the field to be scanned and positioned facing the circular path of said offset end of said first optical fiber whereby a sample of light from the light source is transmitted to the photoelectric means for each rotation of the first optical fiber as its offset end travels in a circular path.

2. A scanner comprising means providing a field to be scanned, a light source positioned to illuminate the field to be scanned, a shaft having its axis directed towards the field to be scanned, a disc rotatably carried by the shaft, motor means for rotation of the disc, means forming a passageway in the disc and shaft, one portion of the passageway extending axially of the shaft, a second intermediate portion of the passageway extending radially of the disc from the first portion, a third portion of the passageway extending from the second intermediate portion thereof in a direction parallel to said first portion, an optical fiber extending through the passageway with its inner end in said first portion of the passageway and its outer end in the third portion thereof directed towards the field to be scanned, and photoelectric means in light receiving relationship with the portion of the fiber extending axially of the shaft and adapted to provide an electric signal variable in magnitude responsive to light passed through the fiber from the field of scan.

3. A scanner comprising means providing a field to be scanned, a light source positioned to illuminate the field to be scanned, a shaft having its axis directed towards the field to be scanned, a disc rotatably carried by the shaft, motor means for rotation of the disc, belt means in driving relationship between the motor means and the disc, the belt means passed around the outer periphery of the disc, means forming a passageway in the disc and shaft, one portion of the passageway extending axially of the shaft, a second intermediate portion of the passageway extending radially of the disc from the first portion, a third portion of the passageway extending from the second intermediate portion thereof in a direction parallel to said first portion, an optical fiber extending through the passageway with its inner end in said first portion of the passageway and its outer end in the third portion thereof directed towards the field to be scanned, and means securing the fiber in position in the passageway, and photoelectric means in light receiving relationship with the portion of the fiber extending axially of the shaft and adapted to provide an electric signal variable in magnitude responsive to light passed through the fiber from the field of scan.

4. A scanner comprising means providing a field to be scanned, a light source positioned to illuminate the field to be scanned, a shaft having its axis directed towards the field to be scanned, a disc rotatably carried by the shaft, motor means, belt means in driving relationship between the motor means and the disc, means forming a passageway in the disc and shaft, one portion of the passageway extending axially of the shaft, a second intermediate portion of the passageway extending radially of the disc from the first portion, a third portion of the passageway extending from the second intermediate portion thereof in a direction parallel to said first portion, a first optical fiber extending through the passageway with its inner end in said first portion of the passageway and its outer end in the third portion thereof directed towards the field to be scanned, and means securing the fiber in position in the passageway, photoelectric means in light receiving relationship with the portion of the fiber extending axially of the shaft and adapted to provide an electric signal variable in magnitude responsive to light passed through the fiber from the field of scan, and a sampling light optical fiber positioned to convey sampling light from the light source to the field to be scanned and positioned facing the path of the outer end of the first optical fiber so that a sample of light from the source is transmitted to the photoelectric means for each rotation of the first optical fiber as its offset end travels in a circular path.

5. A scanner comprising means providing a field to be scanned, a light source positioned to illuminate the field to be scanned, a shaft having its axis directed towards the field to be scanned, a disc rotatably carried by the shaft, motor means, belt means in driving relationship between the motor means and the disc, the belt means passed around the outer periphery of the disc, means forming a passageway in the disc and shaft, one portion of the passageway extending axially of the shaft, a second intermediate portion of the passageway extending radially of the disc from the first portion, a third portion of the passageway extending from the second intermediate portion thereof in a direction parallel to said first portion, a first optical fiber extending through the passageway with its inner end in said first portion of the passageway and its outer end in the third portion thereof directed towards the field to be scanned, and photoelectric means in light receiving relationship with the portion of the fiber extending axially of the shaft and adapted to provide an electric signal variable in magnitude responsive to light passed through the fiber from the field of scan, and a sampling light optical fiber positioned to convey sampling light from the light source to the field to be scanned and positioned facing the path of the outer end of the first optical fiber so that a sample of light from the source is transmitted to the photoelectric means for each rotation of the first optical fiber as its offset end travels in a circular path.

6. A scanner comprising means providing a field to be scanned, a light source positioned to illuminate the field to be scanned, a shaft having its axis directed towards the field to be scanned, a disc rotatably carried by the shaft, motor means for rotation of the disc, means forming a passageway in the disc and shaft, one portion of the passageway extending axially of the shaft, a second intermediate portion of the passageway extending radially of the disc from the first portion, a third portion of the passageway extending from the second intermediate portion thereof in a direction parallel to said first portion, a first optical fiber extending through the passageway with its inner end in said first portion of the passageway and its outer end in the third portion thereof directed towards the field to be scanned, and means securing the fiber in position in the passageway, photoelectric means in light receiving relationship with the portion of the fiber extending axially of the shaft and adapted to provide an electric signal variable in magnitude responsive to light passed through the fiber from the field of scan, and a sampling light optical fiber positioned to convey sampling light from the light source to the field to be scanned and positioned facing the path of the outer end of the first optical fiber so that a sample of light from the source is transmitted to the photoelectric means for each rotation of the first optical fiber as its offset end travels in a circular path.

7. A scanner comprising means providing a field to be scanned, a light source positioned to illuminate the field to be scanned, a shaft having its axis directed towards the field to be scanned, a disc rotatably carried by the shaft, motor means, belt means in driving relationship between the motor means and the disc, the belt passed around the outer periphery of the disc, means forming a passageway in the disc and shaft, one portion of the passageway extending axially of the shaft, a second intermediate portion of the passageway extending radially of the disc from the first portion, a third portion of the passageway extending from the second intermediate portion thereof in a direction parallel to said first portion, a first optical fiber extending through the passageway with its inner end in said first portion of the passageway and its outer end in the third portion thereof directed towards the field to be scanned, and means securing the fiber in position in the passageway, photoelectric means in light receiving relationship with the portion of the fiber extending axially of the shaft and adapted to provide an electric signal variable in magnitude responsive to light passed through the fiber from the field of scan, and a sampling light optical fiber positioned to convey sampling light from the light source to the field to be scanned and positioned facing the path of the outer end of the first optical fiber so that a sample of light from the source is transmitted to the photoelectric means for each rotation of the first optical fiber as its offset end travels in a circular path.

References Cited by the Examiner

UNITED STATES PATENTS

| | | | |
|---|---|---|---|
| 2,659,563 | 11/53 | Saxe | 250—227 X |
| 2,927,502 | 3/60 | Watrous | 88—1 |
| 2,939,362 | 6/60 | Cole | 88—1 |
| 3,118,422 | 1/64 | McNamara | 88—1 |
| 3,125,812 | 3/64 | Simpson | 88—1 |

RALPH G. NILSON, *Primary Examiner.*

WALTER STOLWEIN, *Examiner.*